United States Patent
Liu (10) Patent No.: US 12,498,847 B2
(45) Date of Patent: Dec. 16, 2025

(54) DISPLAY METHOD AND APPARATUS

(71) Applicant: VIVO MOBILE COMMUNICATION CO., LTD., Guangdong (CN)

(72) Inventor: Zhaohui Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 187 days.

(21) Appl. No.: 18/438,463

(22) Filed: Feb. 10, 2024

(65) Prior Publication Data

US 2024/0184434 A1 Jun. 6, 2024

Related U.S. Application Data

(63) Continuation of application No. PCT/CN2022/114408, filed on Aug. 24, 2022.

(30) Foreign Application Priority Data

Aug. 31, 2021 (CN) .......................... 202111014541.6

(51) Int. Cl.
G06F 3/04847 (2022.01)
G06F 3/04842 (2022.01)

(52) U.S. Cl.
CPC ...... *G06F 3/04842* (2013.01); *G06F 3/04847* (2013.01)

(58) Field of Classification Search
CPC .................................................. G06F 3/04847
USPC ......................................................... 715/764
See application file for complete search history.

(56) References Cited

U.S. PATENT DOCUMENTS

| | | | | |
|---|---|---|---|---|
| 9,117,374 | B2* | 8/2015 | Nguyen | .................... G09B 7/00 |
| 12,289,479 | B2* | 4/2025 | Stetson | .................. H04N 7/181 |
| 2001/0044664 | A1* | 11/2001 | Mueller | ................. G11B 27/34 |
| | | | | 381/86 |
| 2005/0195978 | A1* | 9/2005 | Babic | ....................... G06F 21/10 |
| | | | | 380/231 |
| 2007/0244986 | A1* | 10/2007 | Svendsen | ................ H04L 67/06 |
| | | | | 709/217 |

(Continued)

FOREIGN PATENT DOCUMENTS

| | | | | |
|---|---|---|---|---|
| CN | 104735517 | A | 6/2015 | |
| CN | 109905769 | A * | 6/2019 | ............. H04N 21/45 |

(Continued)

OTHER PUBLICATIONS

First Office Action for Chinese Application No. 202111014541.6, dated Jul. 27, 2022, 6 Pages.

(Continued)

*Primary Examiner* — Reza Nabi
(74) *Attorney, Agent, or Firm* — BROOKS KUSHMAN P.C.

(57) ABSTRACT

A display method and apparatus, and pertains to the field of communication technologies. The display method includes: receiving a first input; displaying a first interface of a first application in response to the first input, where the first interface includes object identifier information of at least one object, and the object includes an electronic device or a user; receiving a second input for first object identifier information in the at least one piece of object identifier information; and displaying a first file corresponding to the first object identifier information in response to the second input.

17 Claims, 5 Drawing Sheets

(56) References Cited

U.S. PATENT DOCUMENTS

| | | | |
|---|---|---|---|
| 2010/0023578 A1* | 1/2010 | Brant | G06F 16/639 |
| | | | 726/4 |
| 2011/0167347 A1* | 7/2011 | Joo | G11B 27/34 |
| | | | 715/716 |
| 2013/0159822 A1* | 6/2013 | Grossman | G06F 16/50 |
| | | | 715/201 |
| 2015/0087370 A1* | 3/2015 | Hematji Rajput | G07F 17/3293 |
| | | | 463/11 |
| 2015/0143418 A1* | 5/2015 | Kim | H04N 21/42204 |
| | | | 725/37 |
| 2016/0092065 A1* | 3/2016 | Hilbert | G06F 3/04812 |
| | | | 463/33 |
| 2016/0150284 A1* | 5/2016 | Sokolov | H04N 21/4622 |
| | | | 725/38 |
| 2019/0222898 A1* | 7/2019 | Gao | H04N 21/47202 |
| 2019/0230311 A1* | 7/2019 | He | H04N 21/426 |
| 2021/0127171 A1* | 4/2021 | Liu | G06F 3/0488 |
| 2021/0208697 A1* | 7/2021 | Zhu | H04M 1/0241 |
| 2022/0191556 A1* | 6/2022 | Jiang | H04N 21/8173 |
| 2023/0137492 A1* | 5/2023 | Zheng | G06F 3/04847 |
| | | | 715/719 |
| 2024/0107118 A1* | 3/2024 | Ellingford | H04N 21/4722 |
| 2024/0129573 A1* | 4/2024 | Mitchell | H04N 21/2743 |

FOREIGN PATENT DOCUMENTS

| | | | | |
|---|---|---|---|---|
| CN | 110636345 A | * | 12/2019 | H04N 21/26258 |
| CN | 111131907 A | | 5/2020 | |
| CN | 113709300 A | | 11/2021 | |

OTHER PUBLICATIONS

International Search Report and Written Opinion for Application No. PCT /CN2022/114408, dated Nov. 23, 2022, 8 Pages.

* cited by examiner

DISPLAY METHOD AND APPARATUS

CROSS-REFERENCE TO RELATED APPLICATIONS

This application is a continuation of International Application No. PCT/CN2022/114408 filed on Aug. 24, 2022, which claims priority to Chinese Patent Application No. 202111014541.6 filed on Aug. 31, 2021, which are incorporated herein by reference in their entireties.

TECHNICAL FIELD

This application pertains to the field of communication technologies, and specifically relates to a display method and apparatus.

BACKGROUND

With the development of applications, it is possible to use a same account to log in to a same application on a plurality of electronic device. For example, an account x is used to log in to a video application y on an electronic device A, and the account x is used to log in to the video application y on an electronic device B. For another example, an account m is used to log in to a comic application n on an electronic device C, and the account m is used to log in to the comic application n on an electronic device D.

However, user viewing histories are shared between a plurality of electronic devices when a same account is used to log in to an application. As a result, it is difficult for some users to find a viewing history corresponding to a to-be-viewed file when using the application, thereby making it difficult for the electronic device to display the file to be viewed by the user and resulting in low efficiency of displaying the file.

SUMMARY

According to a first aspect, an embodiment of this application provides a display method. The method is applied to a first electronic device and includes:
  receiving a first input;
  displaying a first interface of a first application in response to the first input, where the first interface includes object identifier information of at least one object, and the object includes an electronic device or a user;
  receiving a second input for first object identifier information in the at least one piece of object identifier information; and
  displaying a first file corresponding to the first object identifier information in response to the second input.

According to a second aspect, an embodiment of this application provides a display apparatus. The apparatus is applied to a first electronic device and includes:
  a first receiving module, configured to receive a first input;
  a first display module, configured to display a first interface of a first application in response to the first input, where the first interface includes object identifier information of at least one object, and the object includes an electronic device or a user;
  a second receiving module, configured to receive a second input for first object identifier information in the at least one piece of object identifier information; and
  a second display module, configured to display a first file corresponding to the first object identifier information in response to the second input.

According to a third aspect, an embodiment of this application provides an electronic device. The electronic device includes a processor, a memory, and a program or an instruction that is stored in the memory and that can be run on the processor, and the program or the instruction is executed by the processor to implement the steps of the method according to the first aspect.

According to a fourth aspect, an embodiment of this application provides a readable storage medium. The readable storage medium stores a program or an instruction, and the program or the instruction is executed by a processor to implement the steps of the method according to the first aspect.

According to a fifth aspect, an embodiment of this application provides a chip. The chip includes a processor and a communication interface, the communication interface is coupled to the processor, and the processor is configured to run a program or an instruction to implement the steps of the method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or"

represents at least one of connected objects, and a character "/" generally represents an "or" relationship between associated objects.

With reference to the accompanying drawings, a display method and apparatus provided in the embodiments of this application are described in detail by using specific embodiments and application scenes thereof.

Figure 1:
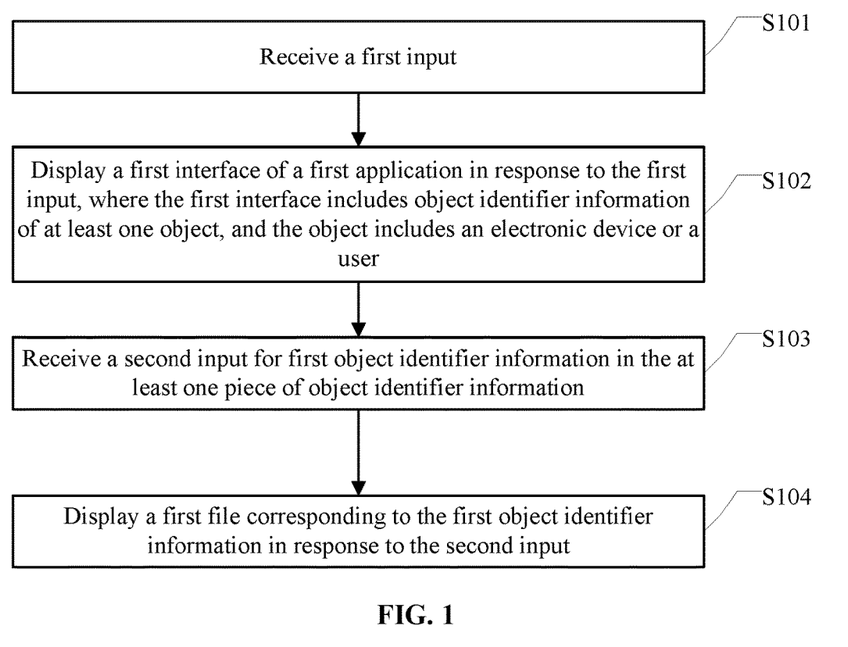
FIG. 1 is a schematic flowchart of a display method applied to a first electronic device according to an embodiment of this application.

FIG. 1 is a schematic flowchart of a display method applied to a first electronic device according to an embodiment of this application. The display method applied to the first electronic device may include:

Step 101: Receive a first input.

Step 102: Display a first interface of a first application in response to the first input, where the first interface includes object identifier information of at least one object, and the object includes an electronic device or a user.

Step 103: Receive a second input for first object identifier information in the at least one piece of object identifier information.

Step 104: Display a first file corresponding to the first object identifier information in response to the second input.

Specific implementations of the foregoing steps are described in detail in the following.

In this embodiment of this application, a first interface that includes object identifier information of at least one electronic device or at least one user can be displayed through one input performed by a user, and a first file corresponding to the electronic device or the user corresponding to first object identifier information can be displayed through one input performed by the user on the first object identifier information in the at least one piece of object identifier information. In this way, the first file corresponding to the electronic device or the user corresponding to the first object identifier information can be displayed through the two inputs performed by the user, and the first file can be displayed through the object identifier information of the electronic device or the user without a need to find a view history of the first file by the user, so that efficiency of displaying the first file can be improved.

In some possible implementations of this embodiment of this application, in step 103, the first object identifier information is any piece of object identifier information in the at least one piece of object identifier information.

For example, the following uses an example in which the first electronic device is an electronic device A, the first application is a video application x, and the object is an electronic device for description.

Figure 2:
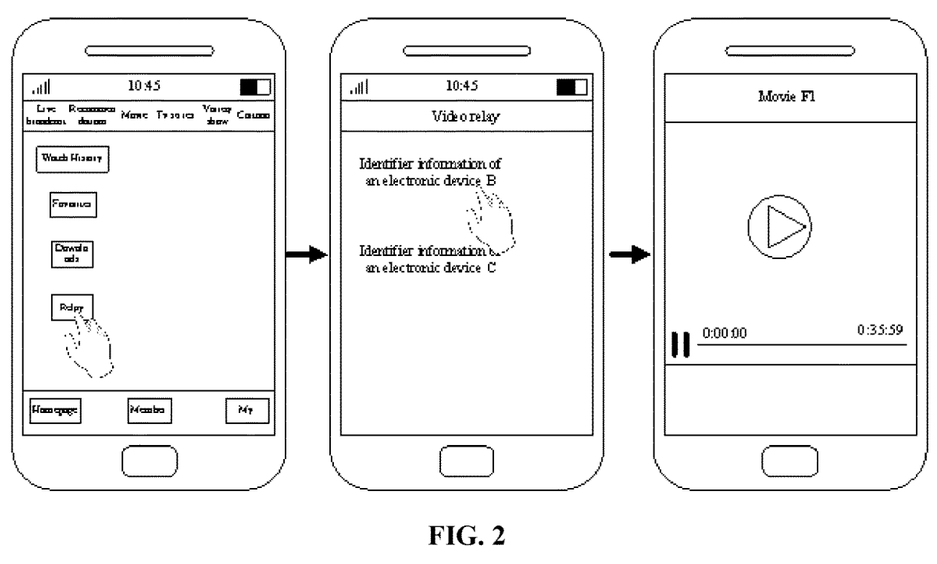
FIG. 2 is a schematic diagram of a process of displaying a file according to an embodiment of this application.

A process of displaying the first file is shown in FIG. 2. FIG. 2 is a schematic diagram of a process of displaying a file according to an embodiment of this application.

In FIG. 2, an interface "My" of the video application x is first displayed. The interface includes controls such as Favorites, Relay, Downloads, Watch History. When the user taps the "Relay" control, it indicates that the user performs the first input. In this case, a "Relay" interface (that is, the foregoing first interface) is displayed, and the "Relay" interface includes identifier information of an electronic device B and identifier information of an electronic device C. When the user taps the identifier information of the electronic device B, it indicates that the user performs the second input. In this case, a file corresponding to the electronic device B is displayed. In FIG. 2, the file corresponding to the electronic device B is a movie F1 whose duration is 35 minutes and 59 seconds.

In some possible implementations of this embodiment of this application, when the object includes an electronic device, the object identifier information may be a physical address or an international mobile subscriber identity (IMSI) or a sequence number of the electronic device. When the object includes a user, the object identifier information may be user fingerprint information, user face information, a user name, or the like.

In some possible implementations of this embodiment of this application, when the object includes an electronic device, the first file may include a file that is of the first application and that is recently displayed by a second electronic device corresponding to the first object identifier information.

For example, a user watches a movie m of a video application x on an electronic device B, and for some reason, the user interrupts watching and closes the video application x. If no other user watches a video of the video application x on the electronic device B in a time period from a time point when the user closes the video application x to a time point when the first electronic device receives a second input for identifier information of the electronic device B, the movie m is a video of the video application x that is recently displayed on the electronic device B. After receiving the second input for the identifier information of the electronic device B, the first electronic device plays the video m.

In some possible implementations of this embodiment of this application, when the object includes a user, the first file may include a file that is of the first application and that is recently viewed by a first user corresponding to the first object identifier information.

For example, a user U1 watches a movie m of a video application x on an electronic device B, and for some reason, the user U1 interrupts watching and closes the video application x. After a period of time, the user U1 watches a movie n of the video application X on an electronic device C, and for some reason, the user U1 interrupts watching and closes the video application X. If the user U1 no longer watches a video of the video application x in a time period from a time point when the user U1 closes the video application x on the electronic device C to a time point when the first electronic device receives a second input for identifier information of the user U1, the movie n is a video of the video application x that is recently watched by the user U1. After receiving the second input for the identifier information of the user U1, the first electronic device plays the video n.

In some possible implementations of this embodiment of this application, the first application may be a video application, and the first file may be a video file. When the video file is played, the video may be played from a start location, that is, played from a first video frame of the video, or may be played from a video frame that is played last time.

In some possible implementations of this embodiment of this application, the first application may be an audio application, and the first file may be an audio file. When the audio file is played, the audio may be played from a start location, that is, played from a first audio frame of the audio, or may be played from an audio frame that is played last time.

In some possible implementations of this embodiment of this application, the first application may be an e-book application, and the first file may be a text file. When the e-book file is displayed, the e-book file may be displayed from a start location of a chapter that is last read by the user. For example, if the user last read a page 4 of a chapter 3 of a novel, the e-book file may be displayed from a start location of the chapter 3 of the novel. Alternatively, the e-book file may be displayed from a quantity of pages in the chapter that is last read by the user. For example, assuming that the user last read a page 4 of a chapter 3 of a novel, the e-book file may be displayed from the page 4 of the chapter 3 of the novel.

In some possible implementations of this embodiment of this application, the first application may be a comic application, and the first file may be a picture file. When the comic file is displayed, the cartoon file may be displayed from a start location of a section (usually also referred to as a chapter or an episode) that is last read by the user. For example, assuming that the user last read a ninth picture of a third episode of a comic, the comic file may be displayed from a start location of the third episode of the comic. Alternatively, the comic file may be displayed from a picture number in a section that is last read by the user. For example, assuming that the user last read a ninth picture in a third episode of a comic, the comic file may be displayed from the ninth picture in the third episode of the comic.

A start location for displaying the first file is not limited in this embodiment of this application. In actual application, this may be set according to an actual situation.

In some possible implementations of this embodiment of this application, file identifier information of the first file may be obtained in advance, and a correspondence between the first object identifier information and the file identifier information of the first file may be established. After the second input is received, file identifier information corresponding to the first object identifier information on which the second input is performed may be determined according to the correspondence, so that a file corresponding to the determined file identifier information is searched for in the first application, and the found file is further displayed.

This embodiment of this application sets no limitation on a manner of obtaining the file identifier information of the first file in advance, and any available manner may be applied to this embodiment of this application. For example, after a playback history of a video application in the second electronic device is updated, the second electronic device actively sends identifier information of a video corresponding to the playback history to the first electronic device. For another example, after a relay point for continuing to play the video played by the second electronic device is created on the first electronic device, the first electronic device sends, to the second electronic device, a request for requesting the second electronic device to play the video in the first application. After receiving the request, the second electronic device responds to the request to send, to the first electronic device, the identifier information of the video played by the second electronic device in the first application.

In some possible implementations of this embodiment of this application, after receiving the second input, a request that is used to request identifier information of a file corresponding to the second electronic device may be further sent to the second electronic device. After receiving the request, the second electronic device sends, to the first electronic device in response to the request, the identifier information of the file corresponding to the second electronic device, so that the first electronic device searches the first application for the file corresponding to the file identifier information, and further displays the found file.

In some possible implementations of this embodiment of this application, before step 104, the display method applied to the first electronic device provided in this embodiment of this application may further include: receiving a third input; and configuring a display parameter corresponding to the first file in response to the third input. Correspondingly, step 104 includes: displaying the first file according to the display parameter.

For example, a video file is used as an example. A window size, a volume, screen brightness, and the like corresponding to the video file may be configured. When the video file is played, the video file is played according to the configured window size, volume, screen brightness, and the like.

In some possible implementations of this embodiment of this application, before step 101, the display method applied to the first electronic device provided in this embodiment of this application may further include: obtaining a first request used to display the first object identifier information; and in response to the first request, in a case that object identifier information of a plurality of objects are allowed to be displayed on the first electronic device, obtaining the first object identifier information; in a case that only one piece of object identifier information is allowed to be displayed on the first electronic device and obtained second object identifier information already exists, deleting the second object identifier information and obtaining the first object identifier information; or in a case that only one piece of object identifier information is allowed to be displayed on the first electronic device and the second object identifier information does not exist, obtaining the first object identifier information.

This embodiment of this application sets no limitation on a manner of obtaining the first request, and any available manner may be applied to this embodiment of this application. For example, a user performs a tap input or a gesture input to add object identifier information. For another example, the first electronic device scans an image code (for example, a two-dimensional code) that is used to add object identifier information and that is on the second electronic device. For another example, two electronic devices touch each other.

For example, in a case that object identifier information of a plurality of objects are allowed to be displayed on the first electronic device, it is assumed that the first electronic device has obtained identifier information of an object m. After obtaining a request used to display identifier information of an object n, the first electronic device directly obtains the identifier information of the object n.

In a case that only one piece of object identifier information is allowed to be displayed on the first electronic device and the obtained second object identifier information already exists, it is assumed that the first electronic device has obtained identifier information of an object m. After obtaining the request used to display the identifier information of the object n, the first electronic device deletes the identifier information of the object m, and then obtains the identifier information of the object n.

In a case that only one piece of object identifier information is allowed to be displayed on the first electronic device and the second object identifier information does not exist, after obtaining the request used to display the identifier information of the object n, the first electronic device directly obtains the identifier information of the object n.

In some possible implementations of this embodiment of this application, in a case that only one piece of object identifier information is allowed to be displayed on the first electronic device and the obtained second object identifier information already exists, when the first request is obtained, prompt information used to query whether the user deletes the second object identifier information may be displayed. After the user chooses to delete the second object identifier information, the second object identifier information is deleted, and the first object identifier information is obtained. After the user chooses not to delete the second object identifier information, the second object identifier information is not deleted, and the first object identifier information is not obtained.

In some possible implementations of this embodiment of this application, before the obtaining a first request used to display the first object identifier information, the display method applied to the first electronic device provided in this embodiment of this application may further include: receiving a fourth input; and in response to the fourth input, configuring a quantity of pieces of object identifier information that are allowed to be displayed on the first electronic device.

For example, an interface for configuring a quantity of pieces of object identifier information that are allowed to be displayed on the first electronic device may be displayed. The interface includes a switch control for configuring a quantity of pieces of object identifier information that are allowed to be displayed on the first electronic device. When the switch control is in a closed state, the first electronic device allows only one piece of object identifier information to be displayed. When the switch control is in an open state, the first electronic device allows a plurality of pieces of object identifier information to be displayed.

In some possible implementations of this embodiment of this application, the display method applied to the first electronic device provided in this embodiment of this application may further include: receiving a fifth input for third object identifier information in the at least one piece of object identifier information, where the third object identifier information is any piece of object identifier information in the at least one piece of object identifier information; and deleting the third object identifier information in response to the fifth input.

For example, it is assumed that object identifier information a and object identifier information b are currently displayed, and after the user performs one deletion input on the object identifier information b, the object identifier information b is deleted.

In some possible implementations of this embodiment of this application, the first application may include at least two playback platforms of a same type. The type in this embodiment of this application includes but is not limited to a video, audio, a comic, and an e-book. For example, when the first application includes at least two playback platforms of a video type, the first application may be understood as a video player integrated with at least two video playback platforms. For example, the first application includes a video playback platform corresponding to a video application a, a video playback platform corresponding to a video application b, and a video playback platform corresponding to a video application c. The playback platform in this embodiment of this application is a platform that provides a file resource.

In some possible implementations of this embodiment of this application, before step 101, the display method applied to the first electronic device provided in this embodiment of this application further includes: displaying a second interface of the first application, where the second interface includes platform identifier information of the at least two playback platforms. Correspondingly, step 101 may include: receiving the first input for first platform identifier information in the at least two pieces of platform identifier information, where the at least one object includes an object corresponding to a first playback platform, and the first playback platform is a playback platform corresponding to the first platform identifier information.

Figure 3:
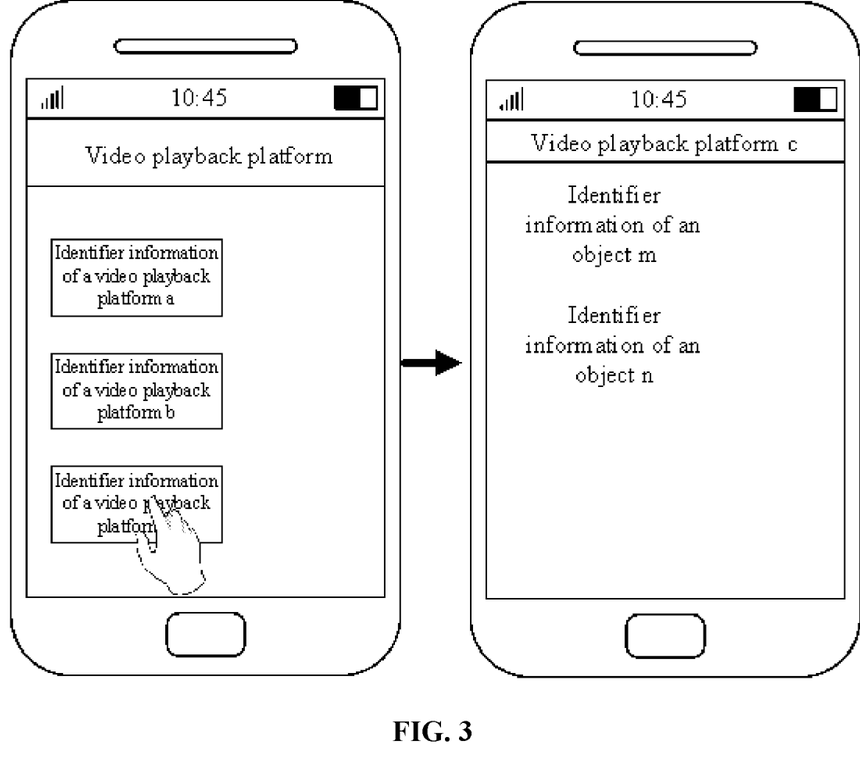
FIG. 3 is a schematic diagram of a process of displaying a first interface according to an embodiment of this application.

For example, as shown in FIG. 3. FIG. 3 is a schematic diagram of a process of displaying a first interface according to an embodiment of this application.

In FIG. 3, an interface including identifier information of a video playback platform a, identifier information of a video playback platform b, and identifier information of a video playback platform c is first displayed, and the interface is an interface of the first application. After the user taps the identifier information of the video playback platform c on the interface, it indicates that the user performs the first input. In this case, identifier information of an object corresponding to the video playback platform c is displayed. In FIG. 3, the identifier information of the object corresponding to the video playback platform c includes identifier information of an object m and identifier information of an object n, that is, the object corresponding to the video playback platform c includes the object m and the object n.

In some possible implementations of the embodiments of this application, the display method applied to the first electronic device provided in this embodiment of this application further includes: receiving an input for the second interface; and adding identifier information of a video playback platform in response to the input.

For example, after the user taps a control "+" on the second interface, identifier information of a video playback platform d is added to the second interface.

In some possible implementations of this embodiment of this application, the display method applied to the first electronic device provided in this embodiment of this application further includes: receiving an input for identifier information of a video playback platform on the second interface; and deleting the identifier information of the video playback platform from the second interface in response to the input.

In some possible implementations of the embodiments of this application, the display method applied to the first electronic device provided in this embodiment of this application further includes: receiving an input for the second interface; and adjusting a display sequence of identifier information of playback platforms on the second interface in response to the input.

For example, it is assumed that the identifier information of the video playback platform a, the identifier information of the video playback platform b, and the identifier information of the video playback platform c are sequentially displayed on the second interface. When the user drags the identifier information of the video playback platform c before the identifier information of the video playback platform a, the identifier information of the video playback platform c, the identifier information of the video playback platform a, and the identifier information of the video playback platform b are sequentially displayed.

In some possible implementations of the embodiments of this application, the display method applied to the first electronic device provided in this embodiment of this application further includes: receiving a sixth input for second platform identifier information in the at least two pieces of platform identifier information, where the second platform identifier information is any piece of platform identifier information in the at least two pieces of platform identifier information; and configuring a file display parameter of a second playback platform corresponding to the second platform identifier information in response to the sixth input, where the file display parameter is used to display a file corresponding to an object corresponding to the second playback platform.

For example, the second interface includes identifier information of a video playback platform a, identifier information of a video playback platform b, and identifier information of a video playback platform c. After the user taps the identifier information of the video playback platform b, a playback parameter corresponding to the video playback platform b is configured, for example, a volume, a window size, and screen brightness. When a video corresponding to an object corresponding to the video playback platform b is played, the video corresponding to the object corresponding to the video playback platform b is played by using the configured playback parameter corresponding to the video playback platform b.

In some possible implementations of this embodiment of this application, file display parameters of different playback platforms may be the same or different.

In some possible implementations of this embodiment of this application, after step 104, the display method applied to the first electronic device provided in this embodiment of this application may further include: in a case that the file display parameter is adjusted in a process of displaying the first file, restoring the file display parameter after display of the first file is exited.

For example, it is assumed that a volume at which a video is played is set to 50 for a video playback platform in advance. When a video corresponding to an object corresponding to the video playback platform is played, the video is played by using the volume 50. In a process of playing the video, it is assumed that the user adjusts the volume to 75, and plays the video by using the volume 75. After play of the video is exited, the volume is restored to 50.

Figure 4:
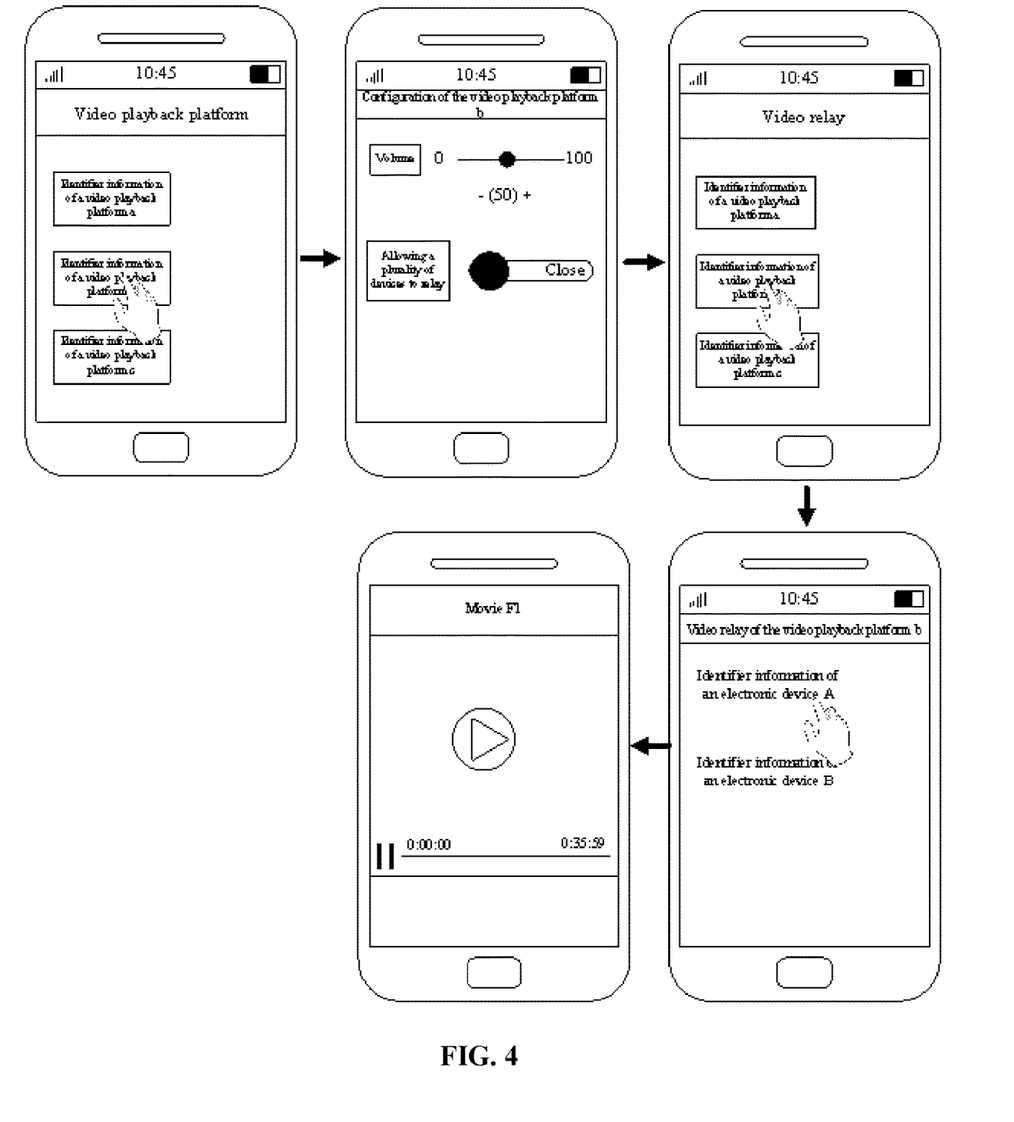
FIG. 4 is a schematic diagram of a process of playing a video according to an embodiment of this application.

With reference to FIG. 4, the following describes the display method applied to the first electronic device provided in this embodiment of this application. FIG. 4 is a schematic diagram of a process of playing a video according to an embodiment of this application.

For example, the first application includes three playback platforms of a video type, and the three playback platforms of the video type are respectively a video playback platform a, a video playback platform b, and a video playback platform c.

The first electronic device first displays an interface including identifier information of the video playback platform a, identifier information of the video playback platform b, and identifier information of the video playback platform c. When the user taps the identifier information of the video playback platform b, a configuration interface corresponding to the video playback platform b is displayed. Based on the configuration interface, the user may configure a video playback parameter (such as a volume, brightness, and a window size) of the video playback platform b and whether to allow display of identifier information of a plurality of devices. In FIG. 4, when a control corresponding to relay of a plurality of devices is allowed to be in an open state, it indicates that identifier information of a plurality of devices is allowed to be displayed. When a control corresponding to relay of a plurality of devices is allowed to be in a closed state, it indicates that only identifier information of one device is allowed to be displayed. In FIG. 4, the control corresponding to the relay of the plurality of devices is allowed to be in an open state.

When a user U1 logs in to a video application or an online playback website corresponding to the video playback platform b on an electronic device A by using an account 1, and watches a movie F1 by using the video application or the online playback website corresponding to the video playback platform b, video relay is triggered by touching the electronic device A with the first electronic device. In this case, the first electronic device obtains identifier information of the electronic device A, the account 1, and identifier information of the movie F1.

When a user U2 logs in to the video application or the online playback website corresponding to the video playback platform b on an electronic device B by using the account 1, and watches a movie F2 by using the video application or the online playback website corresponding to the video playback platform b, video relay is triggered by touching the electronic device B with the first electronic device. In this case, the first electronic device obtains identifier information of the electronic device B, the account 1, and identifier information of the movie F2.

When the user enables, through a series of operations, the first electronic device to display an interface for performing relay play on a video, the interface includes the identifier information of the video playback platform a, the identifier information of the video playback platform b, and the identifier information of the video playback platform c. When the user taps the identifier information of the video playback platform b and logs in to the video playback platform b by using the account 1, the identifier information of the electronic device A and the identifier information of the electronic device B are displayed. After the user taps the identifier information of the electronic device A, the movie F1 is played by using the video playback parameter corresponding to the configured video playback platform b.

It can be understood that identifier information displayed by an electronic device may be different when a user logs in to a video playback platform by using different accounts.

It should be noted that the foregoing uses an example in which the first application is a video application or includes at least two playback platforms of a video type for description. This is only a specific example of this application, and is not intended to constitute a limitation on this application. A file display process when the first application is a comic application or an e-book application is similar to the file display process when the first application is a video application. For details, refer to the file display process when the first application is a video application. A file display process when the first application includes at least two playback platforms of a comic type or at least two playback platforms of an e-book type is similar to the file display process when the first application includes at least two playback platforms of a video type. For details, refer to the file display process when the first application includes at least two playback platforms of a video type. Details are not described again in this embodiment of this application.

In some possible implementations of this embodiment of this application, a same user uses different electronic devices. Based on this, when a file viewed by the user is relayed (continues to be displayed), identifier information (including but not limited to fingerprint information, face information, a name, and the like) of the user that may be obtained first, that is, a fingerprint of the user, a face of the user, a name input by the user, and the like are collected. Then, the file is displayed based on the identifier information of the user.

A process of displaying a file based on identifier information of a user is similar to the foregoing process of displaying a file based on identifier information of an electronic device. For details, refer to the foregoing process of displaying a file based on identifier information of an electronic device. Details are not described again in this embodiment of this application.

It should be noted that the display method provided in the embodiments of this application may be performed by a display apparatus, or a control module that is in the display apparatus and that is configured to perform the display method. In the embodiments of this application, an example in which the display apparatus performs the display method is used to describe the display apparatus provided in the embodiments of this application.

Figure 5:
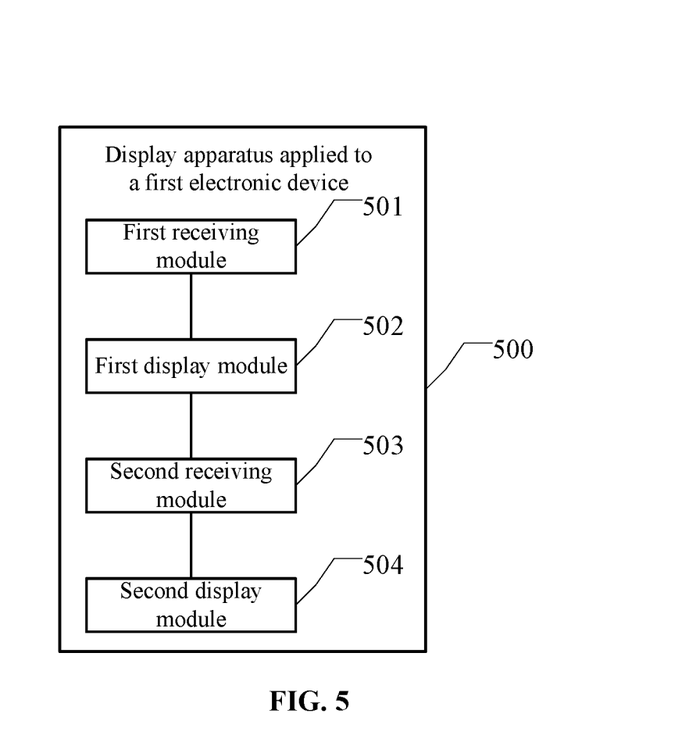
FIG. 5 is a schematic structural diagram of a display apparatus applied to a first electronic device according to an embodiment of this application.

FIG. 5 is a schematic diagram of a structure of a display apparatus applied to a first electronic device according to an embodiment of this application. The display apparatus 500 applied to the first electronic device may include:

- a first receiving module 501, configured to receive a first input;
- a first display module 502, configured to display a first interface of a first application in response to the first input, where the first interface includes object identifier information of at least one object, and the object includes an electronic device or a user;
- a second receiving module 503, configured to receive a second input for first object identifier information in the at least one piece of object identifier information; and
- a second display module 504, configured to display a first file corresponding to the first object identifier information in response to the second input.

In this embodiment of this application, a first interface that includes object identifier information of at least one electronic device or at least one user can be displayed through one input performed by a user, and a first file corresponding to the electronic device or the user corresponding to first object identifier information can be displayed through one input performed by the user on the first object identifier information in the at least one piece of object identifier information. In this way, the first file corresponding to the electronic device or the user corresponding to the first object identifier information can be displayed through the two inputs performed by the user, and the first file can be displayed through the object identifier information of the electronic device or the user without a need to find a view history of the first file by the user, so that efficiency of displaying the first file can be improved.

In some possible implementations of this embodiment of this application, the display apparatus 500 applied to the first electronic device further includes:

- a third receiving module, configured to receive a third input; and
- a first configuration module, configured to configure a display parameter corresponding to the first file in response to the third input; and
- the second display module 504 is specifically configured to:
- display the first file according to the display parameter.

In some possible implementations of this embodiment of this application, the display apparatus 500 applied to the first electronic device further includes:

- a first obtaining module, configured to obtain a first request used to display the first object identifier information; and
- a second obtaining module, configured to: in response to the first request, in a case that object identifier information of a plurality of objects are allowed to be displayed on the first electronic device, obtain the first object identifier information; in a case that only one piece of object identifier information is allowed to be displayed on the first electronic device and obtained second object identifier information already exists, delete the second object identifier information and obtain the first object identifier information; or in a case that only one piece of object identifier information is allowed to be displayed on the first electronic device and the second object identifier information does not exist, obtain the first object identifier information.

In some possible implementations of this embodiment of this application, the display apparatus 500 applied to the first electronic device further includes:

- a fourth receiving module, configured to receive a fourth input; and
- a second configuration module, configured to: in response to the fourth input, configure a quantity of pieces of object identifier information that are allowed to be displayed on the first electronic device.

In some possible implementations of this embodiment of this application, the display apparatus 500 applied to the first electronic device further includes:

- a fifth receiving module, configured to receive a fifth input for third object identifier information in the at least one piece of object identifier information, where the third object identifier information is any piece of object identifier information in the at least one piece of object identifier information; and
- a deleting module, configured to delete the third object identifier information in response to the fifth input.

In some possible implementations of the embodiments of this application, the first application includes at least two playback platforms of a same type; and the display apparatus 500 applied to the first electronic device further includes:

- a third display module, configured to display a second interface of the first application, where the second interface includes platform identifier information of the at least two playback platforms; and
- the first receiving module 501 is specifically configured to:
- receive the first input for first platform identifier information in the at least two pieces of platform identifier information, where
- the at least one object includes an object corresponding to a first playback platform, and the first playback platform is a playback platform corresponding to the first platform identifier information.

In some possible implementations of this embodiment of this application, the display apparatus 500 applied to the first electronic device further includes:

- a sixth receiving module, configured to receive a sixth input for second platform identifier information in the at least two pieces of platform identifier information, where the second platform identifier information is any piece of platform identifier information in the at least two pieces of platform identifier information; and
- a third configuration module, configured to configure a file display parameter of a second playback platform corresponding to the second platform identifier information in response to the sixth input, where the file display parameter is used to display a file corresponding to an object corresponding to the second playback platform.

In some possible implementations of this embodiment of this application, the display apparatus 500 applied to the first electronic device further includes:

- a restoration module, configured to: in a case that the file display parameter is adjusted in a process of displaying the first file, restore the file display parameter after display of the first file is exited.

In some possible implementations of this embodiment of this application, the object includes an electronic device, and the first file includes a file that is of the first application and that is recently displayed by a second electronic device corresponding to the first object identifier information; or
the object includes a user, and the first file includes a file that is of the first application and that is recently viewed by a first user corresponding to the first object identifier information.

The display apparatus applied to the first electronic device in this embodiment of this application may be an apparatus, or may be a component, an integrated circuit, or a chip in a terminal. The first electronic device may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this application.

The first electronic device in this embodiment of this application may be an electronic device with an operating system. The operating system may be an Android operating system, an iOS operating system, or another possible operating system. This is not specifically limited in this embodiment of this application.

The display apparatus applied to the first electronic device provided in this embodiment of this application can implement the processes of the display method embodiment applied to the first electronic device shown in FIG. 1 to FIG. 4. To avoid repetition, details are not described herein again.

Figure 6:
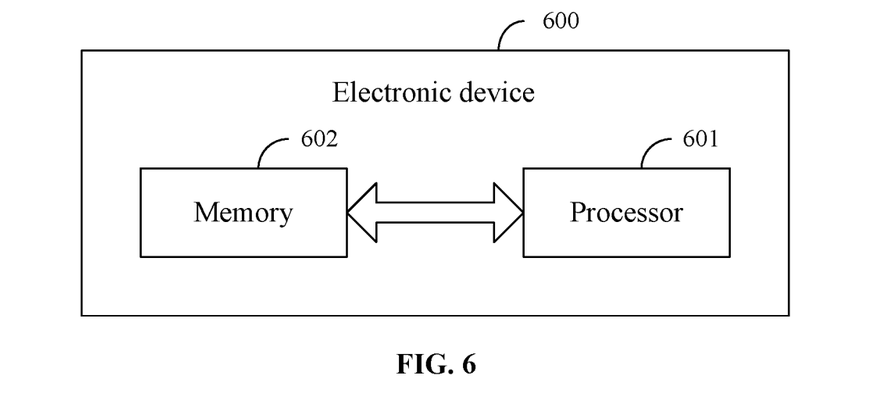
FIG. 6 is a schematic diagram of a structure of an electronic device according to an embodiment of this application.

Optionally, as shown in FIG. 6, an embodiment of this application further provides an electronic device 600, including a processor 601, a memory 602, and a program or an instruction that is stored in the memory 602 and that can run on the processor 601. When the program or the instruction is executed by the processor 601, the processes of the foregoing display method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

In some possible implementations of this embodiment of this application, the processor 601 may include a central processing unit (CPU) or an application specific integrated circuit (ASIC), or may be configured to implement one or more integrated circuits in this embodiment of this application.

In some possible implementations of this embodiment of this application, the memory 602 may include a read-only memory (ROM), a random access memory (RAM), a disk storage medium device, an optical storage medium device, a flash memory device, an electrical, optical, or another physical/tangible storage device. Therefore, generally, the memory includes one or more tangible (non-transient) computer readable storage media (for example, memory devices) that encode software that includes computer executable instructions, and when the software is executed (for example, by one or more processors), the software may perform the operations described with reference to the display method in the embodiments of this application.

Figure 7:
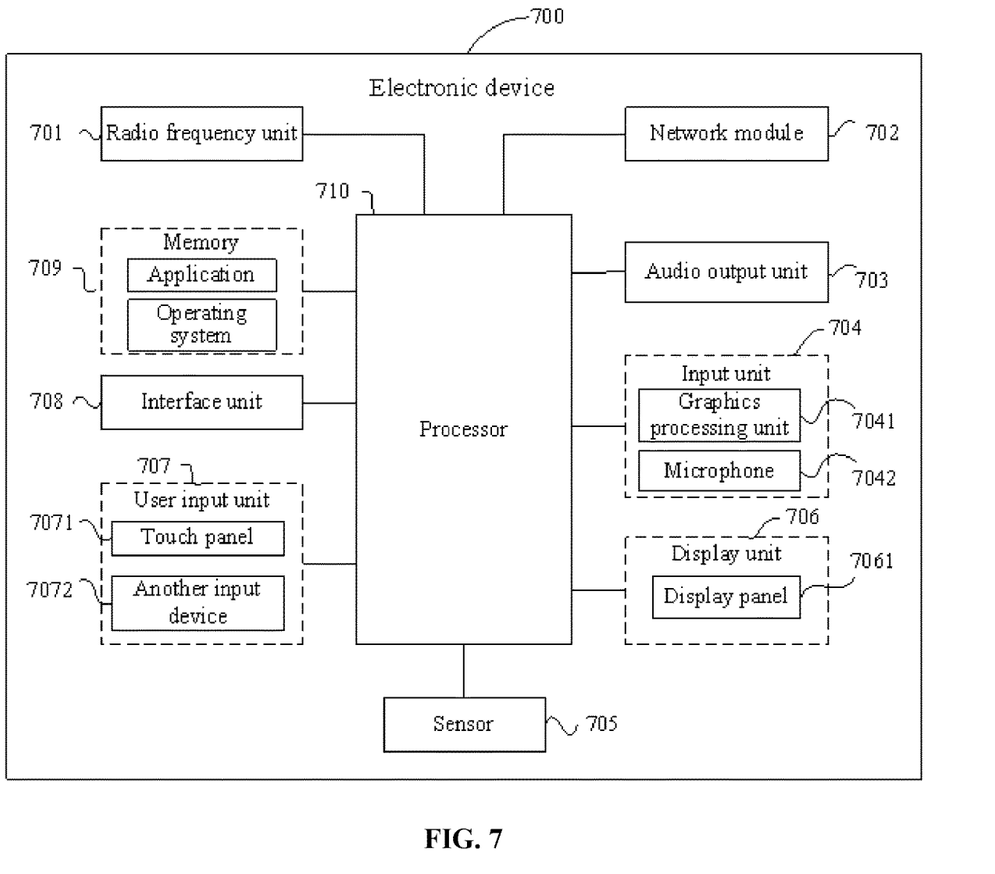
FIG. 7 is a schematic diagram of a hardware structure of an electronic device according to an embodiment of this application.

FIG. 7 is a schematic diagram of a hardware structure of an electronic device according to an embodiment of this application.

An electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the electronic device 700 may further include a power supply (such as a battery) that supplies power to each component. The power supply may be logically connected to the processor 710 by using a power supply management system, to implement functions such as charging and discharging management, and power consumption management by using the power supply management system. The structure of the electronic device shown in FIG. 7 does not constitute a limitation on the electronic device. The electronic device may include components more or fewer than those shown in the diagram, a combination of some components, or different component arrangements. Details are not described herein.

The user input unit 707 is configured to receive a first input.

The display unit 706 is configured to display a first interface of a first application in response to the first input, where the first interface includes object identifier information of at least one object, and the object includes an electronic device or a user.

The user input unit 707 is further configured to receive a second input for first object identifier information in the at least one piece of object identifier information.

The display unit 706 is further configured to display a first file corresponding to the first object identifier information in response to the second input.

In this embodiment of this application, a first interface that includes object identifier information of at least one electronic device or at least one user can be displayed through one input performed by a user, and a first file corresponding to the electronic device or the user corresponding to first object identifier information can be displayed through one input performed by the user on the first object identifier information in the at least one piece of object identifier information. In this way, the first file corresponding to the electronic device or the user corresponding to the first object identifier information can be displayed through the two inputs performed by the user, and the first file can be displayed through the object identifier information of the electronic device or the user without a need to find a view history of the first file by the user, so that efficiency of displaying the first file can be improved.

In some possible implementations of this embodiment of this application, the user input unit 707 is further configured to receive a third input.

The processor 710 is configured to configure a display parameter corresponding to the first file in response to the third input.

Correspondingly, the display unit 706 is specifically configured to:
display the first file according to the display parameter.

In some possible implementations of the embodiments of this application, the processor 710 is further configured to:
obtain a first request used to display the first object identifier information; and
in response to the first request, in a case that object identifier information of a plurality of objects are allowed to be displayed on the electronic device 700, obtain the first object identifier information; in a case that only one piece of object identifier information is allowed to be displayed on the electronic device 700 and obtained second object identifier information already exists, delete the second object identifier information and obtain the first object identifier information; or in a case that only one piece of object identifier information is allowed to be displayed on the electronic device 700 and the second object identifier information does not exist, obtain the first object identifier information.

In some possible implementations of this embodiment of this application, the user input unit 707 is further configured to receive a fourth input.

The processor 710 is further configured to: in response to the fourth input, configure a quantity of pieces of object identifier information that are allowed to be displayed on the electronic device 700.

In some possible implementations of this embodiment of this application, the user input unit 707 is further configured to:

receive a fifth input for third object identifier information in the at least one piece of object identifier information, where the third object identifier information is any piece of object identifier information in the at least one piece of object identifier information.

The processor 710 is further configured to delete the third object identifier information in response to the fifth input.

In some possible implementations of the embodiments of this application, the first application includes at least two playback platforms of a same type; and the display unit 706 is further configured to:

display a second interface of the first application, where the second interface includes platform identifier information of the at least two playback platforms.

The user input unit 707 is specifically configured to:

receive the first input for first platform identifier information in the at least two pieces of platform identifier information, where the at least one object includes an object corresponding to a first playback platform, and the first playback platform is a playback platform corresponding to the first platform identifier information.

In some possible implementations of this embodiment of this application, the user input unit 707 is further configured to:

receive a sixth input for second platform identifier information in the at least two pieces of platform identifier information, where the second platform identifier information is any piece of platform identifier information in the at least two pieces of platform identifier information.

The processor 710 is further configured to configure a file display parameter of a second platform corresponding to the second platform identifier information in response to the sixth input, where the file display parameter is used to display a file corresponding to an object corresponding to the second platform.

In some possible implementations of the embodiments of this application, the processor 710 is further configured to:

in a case that the file display parameter is adjusted in a process of displaying the first file, restore the file display parameter after display of the first file is exited.

In some possible implementations of this embodiment of this application, the object includes an electronic device, and the first file includes a file that is of the first application and that is recently displayed by a second electronic device corresponding to the first object identifier information; or the object includes a user, and the first file includes a file that is of the first application and that is recently viewed by a first user corresponding to the first object identifier information.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein. The memory 709 may be configured to store a software program and various data, including but not limited to an application and an operating system. An application processor and a modem processor may be integrated into the processor 710, the application processor mainly processes an operating system, a user interface, an application, and the like, and the modem processor mainly processes wireless communication. It can be understood that, alternatively, the modem processor may not be integrated into the processor 710.

An embodiment of this application further provides a readable storage medium. The readable storage medium stores a program or an instruction, and the program or the instruction is executed by a processor to implement the processes of the foregoing display method embodiment applied to the first electronic device, and a same technical effect can be achieved. To avoid repetition, details are not described herein again.

The processor is a processor in the electronic device in the foregoing embodiment. The readable storage medium includes a computer readable storage medium, and an example of the computer readable storage medium includes a non-transient computer readable storage medium, such as a ROM, a RAM, a magnetic disk, or an optical disc.

An embodiment of this application further provides a chip. The chip includes a processor and a communication interface, the communication interface is coupled to the processor, and the processor is configured to run a program or an instruction to implement the processes of the foregoing display method embodiment applied to the first electronic device, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the related art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A display method, wherein the method is applied to a first electronic device and comprises:
   receiving a first input;
   displaying a first interface of a first application in response to the first input, wherein the first interface comprises object identifier information of at least one object, and the object comprises an electronic device or a user;
   receiving a second input for first object identifier information in the at least one piece of object identifier information; and
   displaying a first file corresponding to the first object identifier information in response to the second input;
   wherein the first application comprises at least two playback platforms of a same type; and
   before the receiving a first input, the method further comprises:
   displaying a second interface of the first application, wherein the second interface comprises platform identifier information of the at least two playback platforms; and
   the receiving a first input comprises:
   receiving the first input for first platform identifier information in the at least two pieces of platform identifier information, wherein
   the at least one object comprises an object corresponding to a first playback platform, and the first playback platform is a playback platform corresponding to the first platform identifier information.

2. The method according to claim 1, wherein before the displaying a first file corresponding to the first object identifier information, the method further comprises:
   receiving a third input; and
   configuring a display parameter corresponding to the first file in response to the third input; and
   the displaying a first file corresponding to the first object identifier information comprises:
   displaying the first file according to the display parameter.

3. The method according to claim 1, wherein before the receiving a first input, the method further comprises:
   obtaining a first request used to display the first object identifier information; and
   in response to the first request, in a case that object identifier information of a plurality of objects are allowed to be displayed on the first electronic device, obtaining the first object identifier information;
   in a case that only one piece of object identifier information is allowed to be displayed on the first electronic device and obtained second object identifier information already exists, deleting the second object identifier information and obtaining the first object identifier information; or
   in a case that only one piece of object identifier information is allowed to be displayed on the first electronic device and the second object identifier information does not exist, obtaining the first object identifier information.

4. The method according to claim 3, wherein before the obtaining a first request used to display the first object identifier information, the method further comprises:
   receiving a fourth input; and
   in response to the fourth input, configuring a quantity of pieces of object identifier information that are allowed to be displayed on the first electronic device.

5. The method according to claim 1, wherein the method further comprises:
   receiving a fifth input for third object identifier information in the at least one piece of object identifier information, wherein the third object identifier information is any piece of object identifier information in the at least one piece of object identifier information; and
   deleting the third object identifier information in response to the fifth input.

6. The method according to claim 1, wherein the method further comprises:
   receiving a sixth input for second platform identifier information in the at least two pieces of platform identifier information, wherein the second platform identifier information is any piece of platform identifier information in the at least two pieces of platform identifier information; and
   configuring a file display parameter of a second playback platform corresponding to the second platform identifier information in response to the sixth input, wherein the file display parameter is used to display a file corresponding to an object corresponding to the second playback platform.

7. A first electronic device, wherein the first electronic device comprises a processor, a memory, and a program or an instruction that is stored in the memory and that can be run on the processor, and the program or instruction is executed by the processor to implement:
   receiving a first input;
   displaying a first interface of a first application in response to the first input, wherein the first interface comprises object identifier information of at least one object, and the object comprises an electronic device or a user;

receiving a second input for first object identifier information in the at least one piece of object identifier information; and displaying a first file corresponding to the first object identifier information in response to the second input;

wherein the first application comprises at least two playback platforms of a same type; and wherein the program or instruction is further executed by the processor to implement:

before the receiving a first input, displaying a second interface of the first application, wherein the second interface comprises platform identifier information of the at least two playback platforms; and the receiving a first input comprises:

receiving the first input for first platform identifier information in the at least two pieces of platform identifier information, wherein the at least one object comprises an object corresponding to a first playback platform, and the first playback platform is a playback platform corresponding to the first platform identifier information.

8. The first electronic device according to claim 7, wherein the program or instruction is further executed by the processor to implement:

before the displaying a first file corresponding to the first object identifier information, receiving a third input; and configuring a display parameter corresponding to the first file in response to the third input; and the displaying a first file corresponding to the first object identifier information comprises:

displaying the first file according to the display parameter.

9. The first electronic device according to claim 7, wherein the program or instruction is further executed by the processor to implement:

before the receiving a first input, obtaining a first request used to display the first object identifier information; and in response to the first request, in a case that object identifier information of a plurality of objects are allowed to be displayed on the first electronic device, obtaining the first object identifier information;

in a case that only one piece of object identifier information is allowed to be displayed on the first electronic device and obtained second object identifier information already exists, deleting the second object identifier information and obtaining the first object identifier information; or in a case that only one piece of object identifier information is allowed to be displayed on the first electronic device and the second object identifier information does not exist, obtaining the first object identifier information.

10. The first electronic device according to claim 9, wherein the program or instruction is further executed by the processor to implement:

before the obtaining a first request used to display the first object identifier information, receiving a fourth input; and in response to the fourth input, configuring a quantity of pieces of object identifier information that are allowed to be displayed on the first electronic device.

11. The first electronic device according to claim 7, wherein the program or instruction is further executed by the processor to implement:

receiving a fifth input for third object identifier information in the at least one piece of object identifier information, wherein the third object identifier information is any piece of object identifier information in the at least one piece of object identifier information; and deleting the third object identifier information in response to the fifth input.

12. The first electronic device according to claim 7, wherein the program or instruction is further executed by the processor to implement:

receiving a sixth input for second platform identifier information in the at least two pieces of platform identifier information, wherein the second platform identifier information is any piece of platform identifier information in the at least two pieces of platform identifier information; and configuring a file display parameter of a second playback platform corresponding to the second platform identifier information in response to the sixth input, wherein the file display parameter is used to display a file corresponding to an object corresponding to the second playback platform.

13. A non-transitory readable storage medium, wherein a program or an instruction is stored on the non-transitory readable storage medium, and the program or the instruction is executed by a processor associated with a first electronic device to implement:

receiving a first input;

displaying a first interface of a first application in response to the first input, wherein the first interface comprises object identifier information of at least one object, and the object comprises an electronic device or a user;

receiving a second input for first object identifier information in the at least one piece of object identifier information; and displaying a first file corresponding to the first object identifier information in response to the second input;

wherein the first application comprises at least two playback platforms of a same type; and wherein the program or instruction is further executed by the processor to implement:

before the receiving a first input, displaying a second interface of the first application, wherein the second interface comprises platform identifier information of the at least two playback platforms; and the receiving a first input comprises:

receiving the first input for first platform identifier information in the at least two pieces of platform identifier information, wherein the at least one object comprises an object corresponding to a first playback platform, and the first playback platform is a playback platform corresponding to the first platform identifier information.

14. The non-transitory readable storage medium according to claim 13, wherein the program or instruction is further executed by the processor to implement:

before the displaying a first file corresponding to the first object identifier information, receiving a third input; and configuring a display parameter corresponding to the first file in response to the third input; and the displaying a first file corresponding to the first object identifier information comprises:

displaying the first file according to the display parameter.

15. The non-transitory readable storage medium according to claim 13, wherein the program or instruction is further executed by the processor to implement:

before the receiving a first input, obtaining a first request used to display the first object identifier information; and in response to the first request, in a case that object identifier information of a plurality of objects are allowed to be displayed on the first electronic device, obtaining the first object identifier information;

in a case that only one piece of object identifier information is allowed to be displayed on the first electronic device and obtained second object identifier information already exists, deleting the second object identifier information and obtaining the first object identifier information; or in a case that only one piece of object identifier information is allowed to be displayed on the first electronic device and the second object identifier information does not exist, obtaining the first object identifier information.

16. The non-transitory readable storage medium according to claim 15, wherein the program or instruction is further executed by the processor to implement:

before the obtaining a first request used to display the first object identifier information, receiving a fourth input; and in response to the fourth input, configuring a quantity of pieces of object identifier information that are allowed to be displayed on the first electronic device.

17. The non-transitory readable storage medium according to claim 13, wherein the program or instruction is further executed by the processor to implement:

receiving a fifth input for third object identifier information in the at least one piece of object identifier information, wherein the third object identifier information is any piece of object identifier information in the at least one piece of object identifier information; and deleting the third object identifier information in response to the fifth input.

* * * * *